United States Patent
Hazelton et al.

(10) Patent No.: US 6,323,567 B1
(45) Date of Patent: Nov. 27, 2001

(54) CIRCULATING SYSTEM FOR SHAFT-TYPE LINEAR MOTORS

(75) Inventors: Andrew J. Hazelton; Kazuya Ono, both of San Carlos, CA (US)

(73) Assignee: Nikon Corporation (JP)

( * ) Notice: Subject to any disclaimer, the term of this patent is extended or adjusted under 35 U.S.C. 154(b) by 0 days.

(21) Appl. No.: 09/471,296

(22) Filed: Dec. 24, 1999

(51) Int. Cl.$^7$ .............................. H02K 41/00; H02K 9/19
(52) U.S. Cl. ........................................................... 310/12
(58) Field of Search ............................. 310/12, 13, 14

(56) References Cited

U.S. PATENT DOCUMENTS

| | | | |
|---|---|---|---|
| 3,906,261 | * 9/1975 | Ogura et al. | 310/12 |
| 4,243,899 | * 1/1981 | Jaffe | 310/14 |
| 4,460,855 | 7/1984 | Kelly | 318/135 |
| 5,959,732 | * 9/1999 | Hara et al. | 356/358 |
| 6,084,319 | * 7/2000 | Kamata et al. | 310/12 |

FOREIGN PATENT DOCUMENTS

| | | |
|---|---|---|
| 5-45102 | 8/1989 | (JP) . |
| 4052 62222A | * 10/1993 | (JP) . |
| 6-62786 | 9/1994 | (JP) . |
| 10-313566 | 11/1998 | (JP) . |

* cited by examiner

*Primary Examiner*—Nestor Ramirez
*Assistant Examiner*—Judson H. Jones
(74) *Attorney, Agent, or Firm*—Jim Rose, Esq.; Steven G. Roeder

(57) ABSTRACT

A circulating system (10) for cooling a shaft-type linear motor (12) is provided herein. The motor (12) includes a magnet array (22) and a coil assembly (16). The circulating system (10) includes coil housing (36) that encircles the coil assembly (16) and defines a fluid passageway (46) between the coil housing (36) and the coil assembly (16). Fluid (44) from a fluid source (42) is forced through an inlet (38) into the fluid passageway (46). The flow rate of the fluid (44) is controlled to maintain an outer surface (111) of the coil housing (36) at a set temperature to control the effect of the motor (12) on the surrounding environment and the surrounding components.

75 Claims, 10 Drawing Sheets

CIRCULATING SYSTEM FOR SHAFT-TYPE LINEAR MOTORS

FIELD OF THE INVENTION

The present invention relates to a circulating system for shaft-type linear motors. The invention is particularly useful for maintaining an outer surface of a linear motor at a set temperature to control the effect of the motor on the surrounding environment and the surrounding components.

BACKGROUND

Linear motors are used in a variety of electrical devices. For example, linear motors are used in exposure apparatuses for semiconductor processing, other semiconductor processing equipment, elevators, electric razors, machine tools, machines, inspection machines, and disk drives.

Exposure apparatuses for semiconductor processing are commonly used to transfer images from a reticle onto a semiconductor wafer. A typical exposure apparatus utilizes one or more linear motors to precisely position a wafer stage holding the semiconductor wafer relative to the reticle. The images transferred onto the wafer from the reticle are extremely small. Accordingly, the precise positioning of the wafer and the reticle is critical to the manufacturing of the wafer. In order to obtain precise relative positioning, the reticle and the wafer are constantly monitored by a metrology system. Subsequently, with the information from the metrology system, the reticle and/or wafer are moved by one or more linear motors to obtain relative alignment.

One type of linear motor is a shaft type linear motor. A typical, shaft-type linear motor includes a magnet array that generates a magnetic field and a coil array that encircles the magnet array. The coil array includes a plurality of coils that are individually supplied with an electrical current. The electrical current supplied to the coils generates an electromagnetic field that interacts with the magnetic field of the magnet array. This causes the coil array to move relative to the magnet array. When the coil array is secured to the wafer stage, the wafer stage moves in concert with the coil array.

Unfortunately, the electrical current supplied to the coils also generates heat, due to resistance in the coils. Most linear motors are not actively cooled. Thus, the heat from the coils is subsequently transferred to the surrounding environment, including the air surrounding the linear motor and the other components positioned near the linear motor, The heat changes the index of refraction of the surrounding air. This reduces the accuracy of any metrology system and degrades machine positioning accuracy. Further, the heat causes expansion of the other components of the device. This further degrades the accuracy of the device. Moreover, the resistance of the coils increases as temperature increases. This exacerbates the heating problem and reduces the performance and life of the motor.

In light of the above, it is an object of the present invention to provide a system for maintaining an outside surface of a linear motor at a set temperature during operation. It is another object of the present invention to provide a system for cooling the coil array of a shaft-type linear motor. Still another object of the present invention is to provide an exposure apparatus capable of manufacturing high density semiconductor wafers.

SUMMARY

The present invention is directed to a circulating system for a coil assembly of a linear motor. The circulating system includes a coil housing and an inlet. The coil housing has a first body section that encircles the coil assembly and provides a fluid passageway around the coil assembly. The inlet extends into the fluid passageway and is in fluid communication with a fluid source. Fluid from the fluid source is directed or forced through the inlet into the fluid passageway. The present invention is particularly useful for cooling shaft-type linear motors that have a tubular shaped coil assembly.

Preferably, the rate of flow of the fluid to the fluid passageway is controlled to maintain an outer surface of the coil housing at a predetermined temperature. By controlling the outer surface temperature of the coil housing, heat transferred from the coil assembly to the surrounding environment can be controlled and/or eliminated. This minimizes the effect of the coil assembly on the surrounding environment.

The coil housing can also include a first end section, a second end section, and a second body section that cooperate to fully enclose the coil assembly and provide a fluid passageway which substantially surrounds the coil assembly. As provided herein, the coil assembly is positioned between the first body section and the second body section and between the first end section and the second end section.

Preferably, a plurality of spaced apart, coil supports are used to secure the coil assembly spaced apart from the coil housing. Each coil support is designed to have a relatively high ratio of surface area to volume. For example, a relatively small diameter pin can be used for each coil support. This allows the coil supports to easily dissipate heat to the fluid. Further, this minimizes direct thermal contact between the coil housing and the coil assembly and minimizes the heat transfer from the coil assembly to the coil housing. Additionally, the coil supports maximize the area of the coil assembly that is exposed for cooling with the fluid.

As provided herein, the coil supports can secure the coil assembly to the end sections. In this version, some of the coil supports extend between the coil assembly and the first end section and some of the coil supports extend between the coil assembly and the second end section to support the coil assembly between the end sections.

Additionally, the present invention includes an outlet that is in fluid communication with the fluid passageway. The outlet allows the fluid to be transferred from the fluid passageway back to the fluid source.

As number of alternate locations for the inlet and/or outlet are provided herein. For example, in one embodiment, the inlet extends into the fluid passageway near the first end section while the outlet extends into the fluid passageway near the second end section. In this embodiment, the fluid flows from near the first end section, through the fluid passageway along the length of the coil assembly and out the fluid passageway near the second end section.

In another embodiment, the invention includes a pair of spaced apart inlets. Each inlet extends into the fluid passageway near one of the end sections. The outlet extends into the fluid passageway intermediate the end sections. In this embodiment, the fluid enters into the fluid passageway near each end section. Subsequently, the fluid flows from each end section along approximately one-half of the coil assembly and exits the center of the coil assembly. With this embodiment, the coil supports near each end section are easily cooled with the fluid that is just entering the fluid passageway.

In another embodiment, the invention also includes a pair of spaced apart inlets. In this embodiment, one of the inlets is a primary inlet that extends into the fluid passageway near the first end section and one of the inlets is a secondary inlet that extends into the fluid passageway near the second end section. The outlet extends into the fluid passageway near the second end section. The fluid source supplies fluid at a greater rate to the primary inlet than the secondary inlet. In this embodiment, the secondary inlet provides additional fluid to cool the coil supports near the second end section.

In still another embodiment, the invention includes a separate, second fluid passageway near the coil assembly. In this embodiment, fluid from the fluid source is directed into the second fluid passageway. Preferably, the flow of fluid in the second fluid passageway is opposite from the flow of fluid in the other fluid passageway. More specifically, in the fluid passageway, fluid flows from the first end section towards the second end section. In the second fluid passageway, fluid flows from the second end section towards the first end section. This design allows for more uniform cooling because each end section receives relatively cool fluid.

The present invention is also directed to a method for cooling a shaft-type linear motor, the method includes the steps of providing a coil housing, positioning the coil assembly within a housing cavity of the coil housing and directing a fluid through the housing cavity to cool the coil assembly. The method can also include the step of maintaining the outside surface of the coil housing at a set temperature. This minimizes the effects of the coil assembly on the surrounding environment.

The present invention is also directed to a method for making a circulating system, a method for making a linear motor, a method for manufacturing an exposure apparatus and a method for manufacturing a device or a wafer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
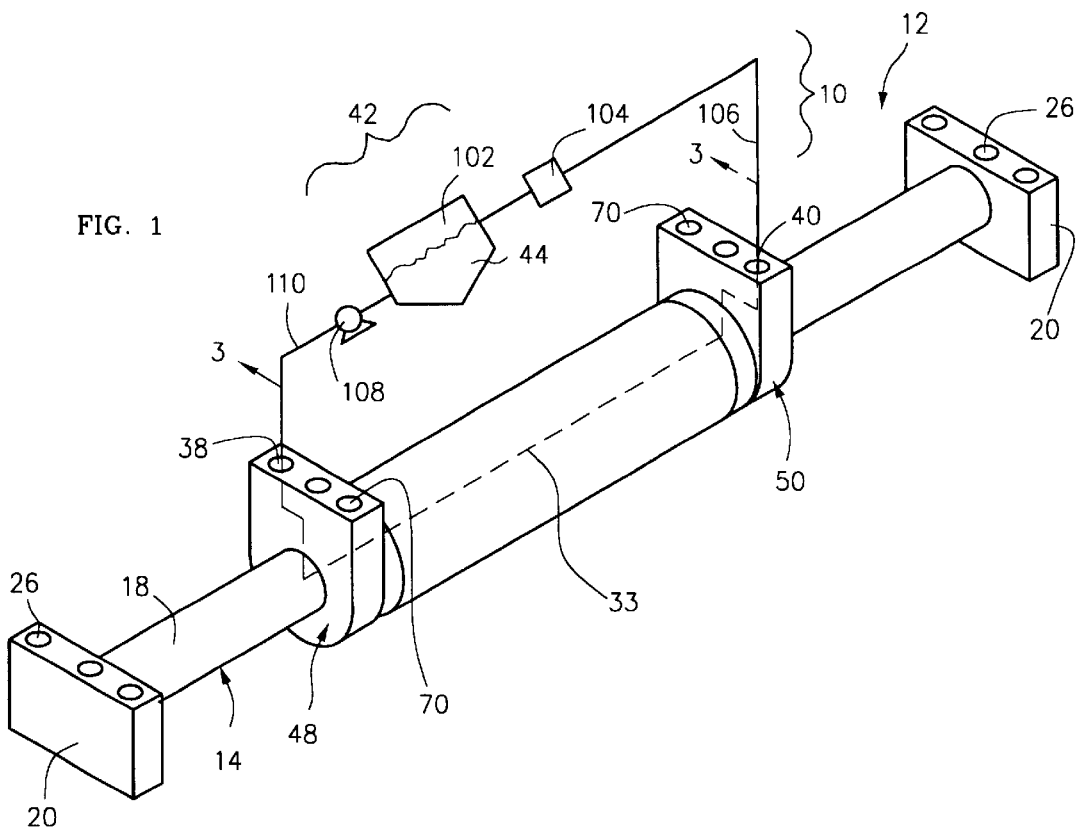
FIG. 1 is a perspective view of a linear motor and a circulating system having features of the present invention.
Figure 3:
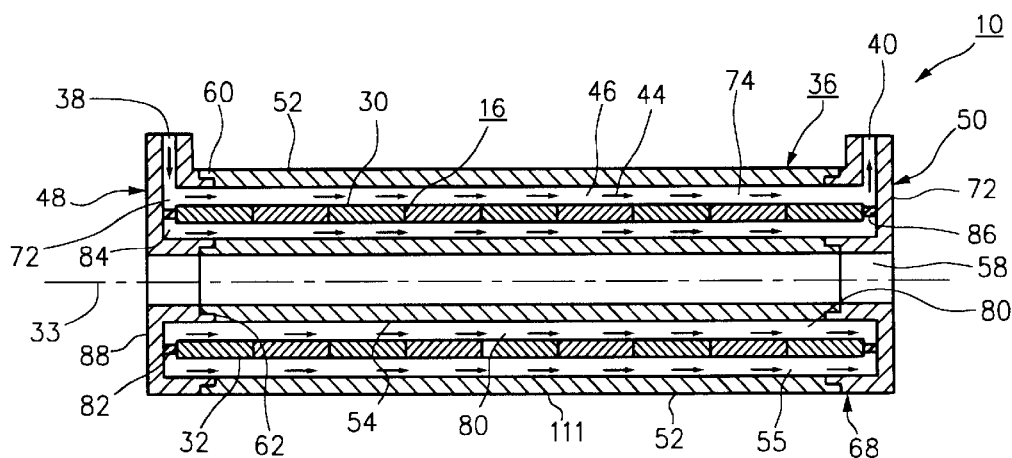
FIG. 3 is a cross-sectional view of a coil assembly and a coil housing having features of the present invention taken on line 3—3 in FIG. 1.
Figure 2:
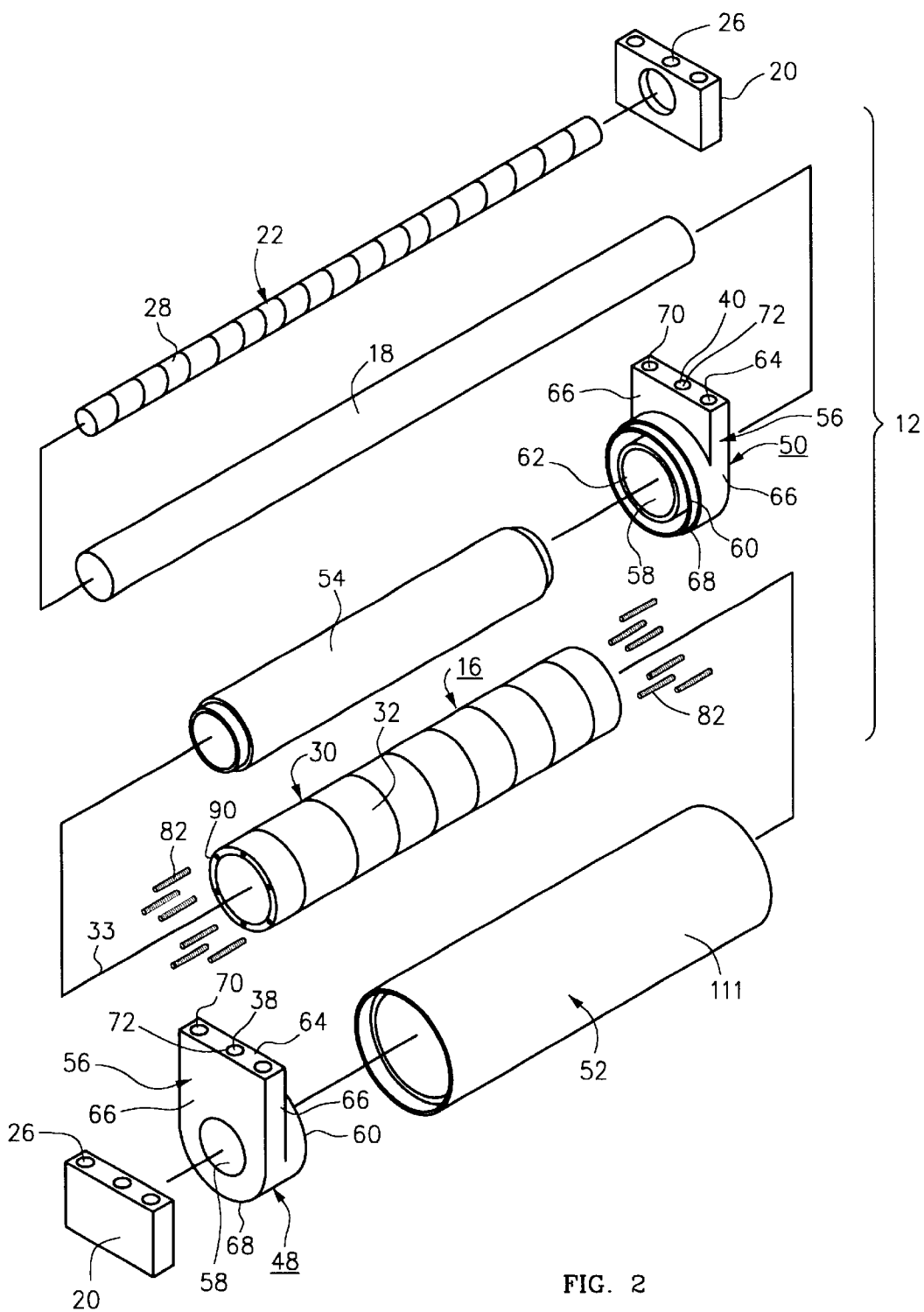
FIG. 2 is an exploded perspective view of the linear motor of FIG. 1.

Referring to FIGS. 1–3, the present invention is directed to a circulating system 10 for an electric motor 12. The enteric motor 12 illustrated in FIGS. 1–3 is a shaft-type linear motor and includes a magnet assembly 14 and coil assembly 16. Preferably, the circulating system 10 cools the coil assembly 16 and inhibits heat transfer from the motor 12 to the coil assembly 16 on the surrounding environment and allows for more accurate positioning by motor 12.

The desing of the magnet assembly 14 can be varied to suit the desing requirements in the motor 12. The magnet assembly 14 includes a magnet housing 18, a pair of spaced apart mounts 20 and a magnet array 22 (illustrated in FIG. 2). The magnet housing 18 illustrated in the FIG. 2 is tubular shaped, receives the magnet array 22, and fits within the coil assembly 16.

The mounts 20 are attached to the ends of the magnet housing 18 and retain the magnet array 22 within the magnet housing 18. Additionally, the mounts 20 secure the motor 12 to the desired mounting surface 24 (illustrated in FIG. 11). In the embodiment illustrated in FIGS. 1 and 2, each mount 20 is rectangular shaped and includes three attachers 26 for securing each mount 20 to the mounting surface 24. Each attacher 26 can be an aperture that extends through the mount 20 as illustrated in the Figures. Alternately, for example, each attacher 28 can be an externally threaded member (not shown) or an internally threaded surface (not shown). The mounts 20 can be secured to the magnet housing 18 with a weld (not shown) or other suitable means.

The magnet array 22 generates a magnetic field (not shown) that interacts with the coil assembly 16. The design of the magnet array 22 can be varied to suit the design requirements of the motor 12. Typically, the magnet array 22 includes a number of individual magnets 28 which are positioned side-by-side within the magnet housing 18. Each magnet 28 is typically right cylindrical shaped as illustrated in FIG. 2 or annular shaped.

The design of the coil assembly 16 can be varied to suit the design requirements of the motor 12. In the embodiment illustrated in the Figures, the coil assembly 16 is tubular shaped, encircles a portion of the magnet housing 18 and is designed to move relative to the magnet housing 18. Alternately, for example, for a shaft-type linear motor, the coil assembly could encircle the magnet assembly, the magnet assembly could move relative to the coil assembly and/or the coil assembly and magnet housing could have a rectangular shaped cross-section.

The coil assembly 16 includes one or more tubular shaped coil arrays 30. Further, each coil array 30 includes one or more, tubular shaped, individual coils 32 which are secured side-by-side together. Each coil 32 is made of electrical wire encapsulated in an epoxy. Electrical current (not shown) is supplied to each individual coil 32. The electrical current in the coils 32 interacts with the magnetic field of the magnet array 22. This causes a force between the coils 32 and the magnet assembly 14, which can be used to move the coil assembly 16 relative to the magnet assembly 14. Further, the electric current causes the coils 32 to generate heat.

Figure 7:
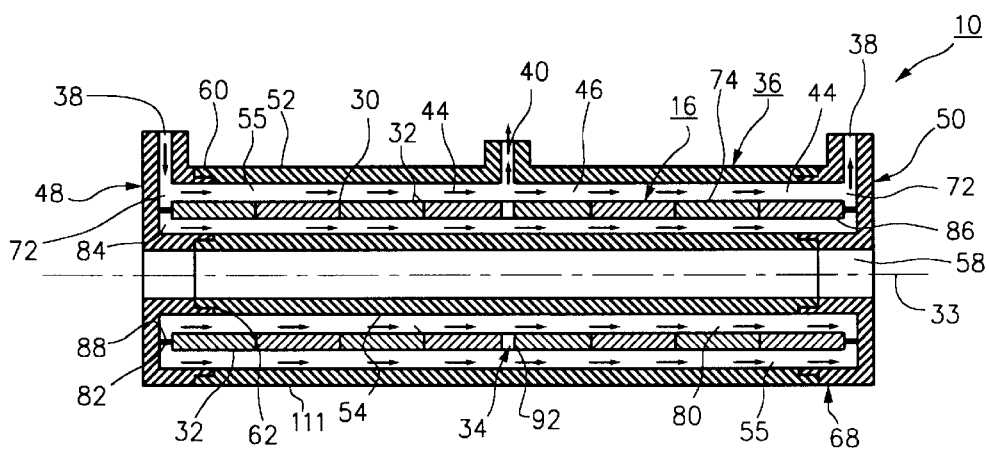
FIG. 7 is a cross-sectional view of another embodiment of a coil assembly and coil housing having features of the present invention.
Figure 8:
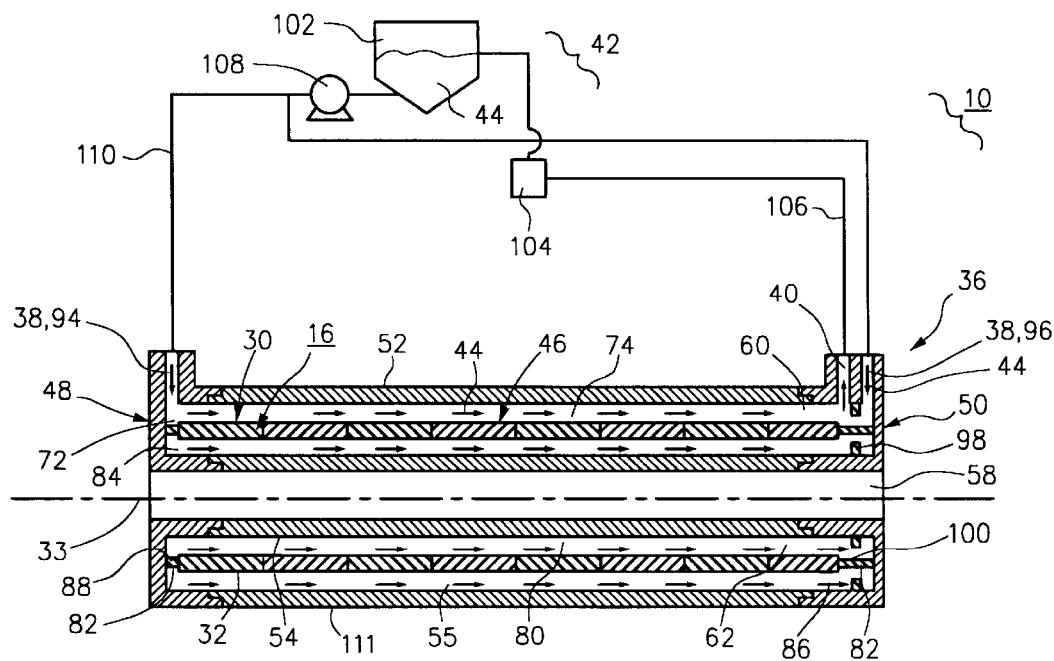
FIG. 8 is a cross-sectional view of yet another embodiment of a coil assembly and coil housing having features of the present invention and an illustration of a fluid source.

In the embodiments illustrated in FIGS. 2, 3, and 8, the coil assembly 16 includes a single coil array 20 having nine (9) coils 32 secured side-by-side along a coil axis 33 of the coil assembly 16. Alternately, in the embodiment illustrated in FIG. 7, the coil assembly 16 includes two coil arrays 30 and a spacer 34 that secures the coil arrays 30 together. in FIG. 7, each coil array 30 includes five (5) coils 32 secured side-by-side. It should be understood that the number of coil arrays 30 and the number of coils 32 in each coil array 30 can be varied to suit the design requirements of the motor 12.

Importantly, the present invention utilizes the circulating system 10 to maintain the temperature of the coil assembly 16 and inhibit the coil assembly 16 from transferring heat to the environment that surrounds the motor 12. The circulating system 10 includes a coil housing 36, one or more inlets 38, one or more outlets 40, and a fluid source 42 providing a fluid 44 to cool the coil assembly 16.

The coil housing 36 surrounds the coil assembly 16 and provides a fluid passageway 46 between the coil housing 36 and the coil assembly 16. Preferably, the fluid passageway 46 encircles substantially the entire coil assembly 16 so that the fluid 44 passes over and contacts substantially the entire coil assembly 16. Further, the coil housing 36 supports the coil assembly 16 spaced apart from the magnet housing 18. Thus, with the present invention, the same coil housing 36 is used to support the coil assembly 16 and provide a fluid passageway 46 to cool the coil assembly 16.

The design of the coil housing 36 is varied according to the design of the coil assembly 16. In the embodiments illustrated in the Figures, the coil housing 36 includes a first end section 48, a second end section 50, a first body section 52 and a second body section 54 which cooperate to define a housing cavity 55 that receives the coil assembly 16. The coil assembly 16 is positioned (i) between the first end section 48 and the second end section 50 and (ii) between the first body section 52 and the second body section 54. The housing cavity 55 is tubular shaped for a tubular shaped coil assembly 16.

The end sections 48, 50 are spaced apart and support the first body section 52 and the second body section 54 spaced apart from the coil assembly 16. The design of the end sections 48, 50 can be varied according to the design of the rest of the motor 12. As can best be seen with reference to FIGS. 2 and 4, each end section 48, 50 includes an end body 56, a housing aperture 58, a first body support 60, and a spaced apart second body support 62. Each end section 48, 50 is preferably made of a low or non-electrically conductive, non-magnetic material, such as low electrical conductivity stainless steel or titanium, or non-electrically conductive plastic or ceramic.

Figure 4:
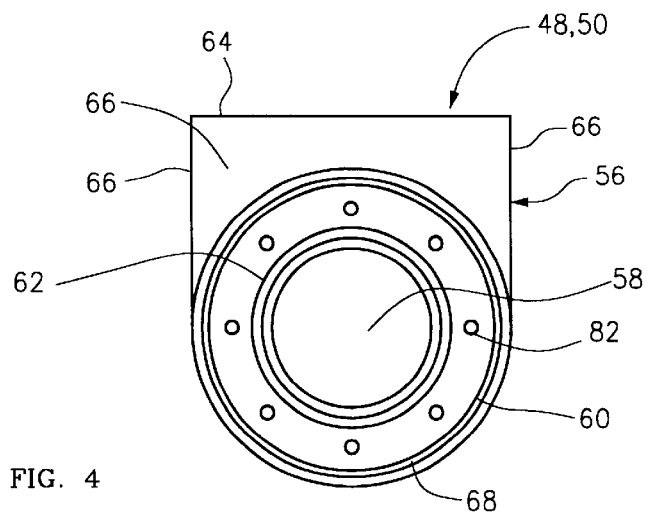
FIG. 4 is a side plan view of an end section having features of the present invention.

The end body 56 is somewhat rectangular shaped and includes a flat top 64, four flat sides 66 and a rounded bottom 68. The housing aperture 58 extends transversely through the end body 56. The housing aperture 58 is sized and shaped to receive the magnet housing 18 so that each end section 48, 50 encircles the magnet housing 18. The first body support 60 supports the first body section 52 spaced apart from the coil assembly 16 and the a second body support 62 supports the second body section 54 spaced apart from the coil assembly 16. As illustrated in FIGS. 2–4, each body support 60, 62 can be a tubular shaped projection that cantilevers away from one of the sides 66 of the end body 56. Further, in this embodiment each body support 60, 62 are substantially concentric with the housing aperture 58.

Additionally, each end body 56 can include a pair of spaced apart end attachers 70 for securing the coil housing 36 to the object desired to be moved. Each end attacher 70 can be an aperture that extends into the top 64 of each end body 56 as illustrated in the Figures. Alternately, for example, each end attacher 70 can be an externally threaded member or an internally threaded surface.

Further, one or both of the end sections 48, 50 can include one or more end channels 72 which provide the inlet 38 or outlet 40 to the fluid passageway 46. In the embodiments illustrated herein, each end channel 72 is an aperture that extends from the top 64 of each end body 56 into the gap between the first body support 60 and the second body support 62.

The first body section 52 is retained by the first body support 60 of each end section 48, 50. In the embodiments illustrated in FIGS. 1–3 and 6–8, the first body section 52 is tubular shaped and encircles the coil assembly 16 (not shown in FIGS. 1 and 6). Further, the first body section 52 is spaced apart from the coil assembly 16 and defines a tubular shaped, first passageway 74 between the coil assembly 16 and the first body section 52. Additionally, the first body section 52 is substantially concentric with the coil assembly 16.

Figure 5:
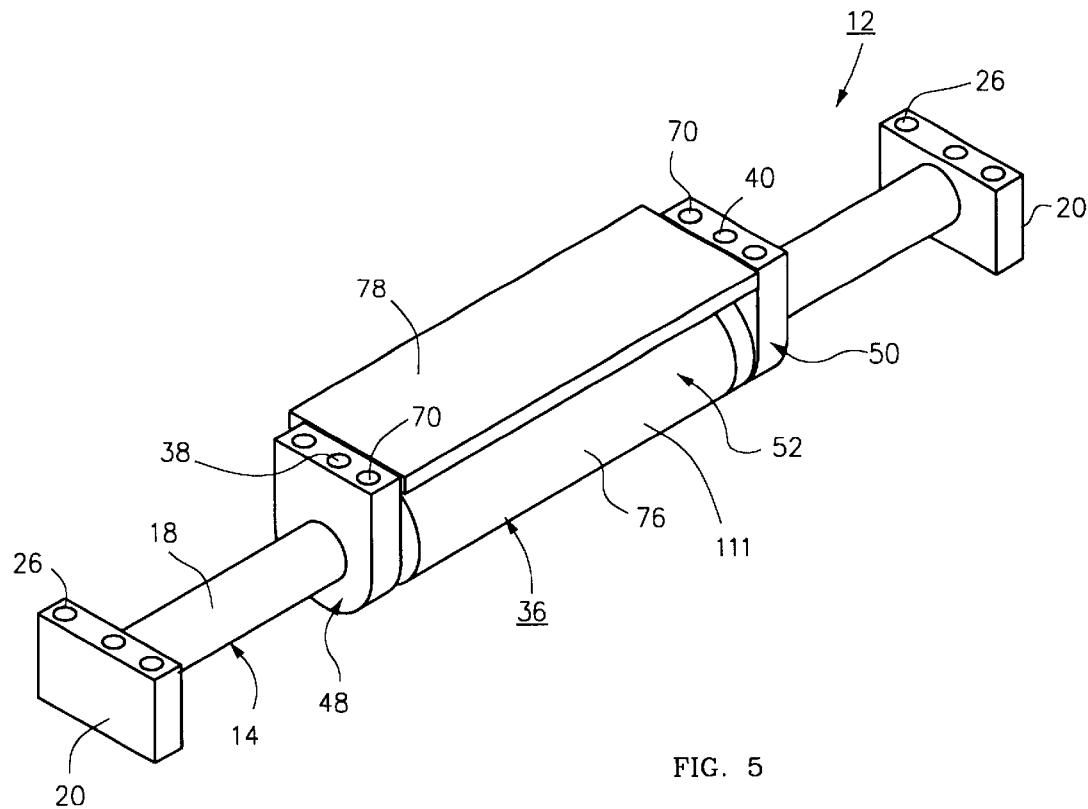
FIG. 5 is a perspective view of an alternate embodiment of a linear motor having features of the present invention.

FIG. 5 illustrates an aftemnate embodiment of the first body section 52. In this embodiment, the first body section 52 includes an arch shaped section 76 and a flat, planar shaped section 78 which are secured together and encircle the coil assembly 16. In this embodiment, the first body section 52 is again spaced apart from the coil assembly 16 and defines a somewhat arch shaped first passageway 74 (not shown in FIG. 5) between the coil assembly 16 and the first body section 52.

The second body section 54 is retained by the second body support 62 of each end section 48, 50. The second body section 54 is sized and shaped to fit within and be encircled by the coil assembly 16. The second body section 52 is spaced apart from the coil assembly 16 and defines a tubular shaped, second passageway 80 between the second body section 54 and the coil assembly 16. The second body section 54 illustrated in the Figures is tubular shaped and substantially concentric with the coil assembly 16 and the first body section 52.

The first body section 52 and the second body section 54 are preferably made of a low or non-electrically conductive, non-magnetic material such as low electrical conductivity stainless steel or titanium, or non-electrically conductive plastic or ceramic. In the embodiment illustrated in the Figures, the first body section 52 has an outer diameter of between approximately 70–75 mm and the second body section 54 has an outer diameter of approximately 50 mm. Each body section 52, 54 have a wall thickness of approximately 1 mm.

As illustrated in FIGS. 2, 3, 7, and 8, a plurality of spaced apart, coil supports 82 are preferably used to secure the coil assembly 16 spaced apart from the coil housing 36. Each coil support 82 is designed to have a relatively high ratio of surface area to volume. This minimizes the heat transferred from the coil assembly 16 to the coil housing 36 through the coil supports 82 and allows the coil supports 82 to readily dissipate the heat to the fluid 44. Further, this allows substantially all of the coil assembly 16 to be separated from the coil housing 36.

In the embodiments illustrated herein, some of the coil supports 82 extend between the coil assembly 16 and the first end section 48 and some of the coil supports 82 extend between the coil assembly 16 and the second end section 50. Stated another way, the coil supports 82 secure the coil assembly 16 to the end sections 48, 50 with the coil assembly 16 spaced apart from end sections 48, 50. The distance in which the coil supports 82 maintain the coil assembly 16 spaced apart from the end sections 48, 50 is preferably between approximately 1 mm and 4 mm. Importantly, the coil supports 82 provide a first end passageway 84 between the coil assembly 16 and the first end section 48 and a second end passageway 86 between the coil assembly 16 and the second end section 50. This allows for flow of the fluid 44 between each end section 48, 50 and the coil assembly 16.

In the embodiments illustrated in FIGS. 2–4, 7, and 8, each coil support 82 is a right cylindrical shaped pin having diameter of between approximately 3 mm and 8 mm. Each coil support 82 is preferably made of a low or non-electrically conductive, non-magnetic material, such as low electrical conductivity stainless steel or titanium, or non-electrically conductive plastic or ceramic. Each coil support 82 is press fit into an end aperture 88 in one of the end sections 48, 50 and a coil aperture 90 in the coil assembly 16. Alternately, each coil support 82 can be epoxied directly to the surface of the first end section 48, or the second end section 50 and the coil assembly 16. Still alternately, each coil support 82 can be epoxied into the end aperture 88 in one of the end sections 48, 50 and one of the coil apertures 90 in the coil assembly 16.

Figure 9:
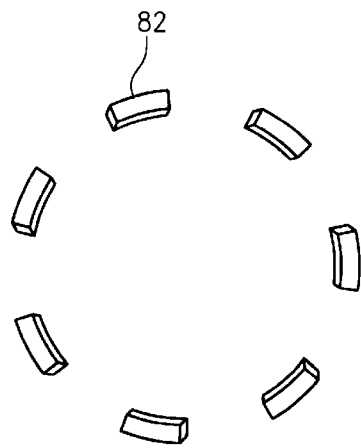
FIG. 9 is a perspective view of a plurality of coil supports having features of the present invention.

FIG. 9 illustrates a perspective view of a set of coil supports 82 which can alternately be used to maintain the coil assembly 16 spaced apart from the end sections 48, 50. In particular, in FIG. 9, each coil support 82 is arch shaped. Stated another way, each coil support 82 is shaped similar to a segment of an annular shaped ring (arc shaped). In this embodiment, each coil support 82 can be secured with an adhesive such as an epoxy to the coil assembly 16 and one of the end sections 48, 50. Afternately, for example, each coil support 82 can be retained with pressure between one of the end sections 48, 50 and the coil assembly 16.

As provided above, the fluid passageway 46 preferably surrounds substantially the entire coil assembly 16. The fluid passageway 46 includes the first passageway 74 between the first body section 52 and the coil assembly 16, the second passageway 80 between the second body section 54 and the coil assembly 16, the first end passageway 84 between the first end section 48 and the coil assembly 16 and the second end passageway 86 between the second end section 50 and the coil assembly 16. The fluid passageway 46 provides an approximately 1 mm to 4 mm gap between the coil housing 36 and the coil assembly 16.

The inlet(s) 38 extend into the fluid passageway 46 so that the fluid passageway 46 is in fluid communication with the fluid source 42. This allows fluid 44 from the fluid source 42 to be supplied to the fluid passageway 46 to cool the coil assembly 16. Additionally, the outlet(s) 40 extend into the fluid passageway 46 and allow the fluid 44 to be transferred from the fluid passageway 46 back to the fluid source 42.

Importantly, the location of the inlet(s) 38 and outlet(s) 40 can affect the cooling of the motor 12. A number of alternate locations for the inlet(s) 38 and/or outlet(s) 40 are provided herein. For example, in the embodiment illustrated in FIGS. 1–3, the inlet 38 extends into the fluid passageway 46 near a first end section 48 of the coil housing 36 and the outlet 40 extends into the fluid passageway 46 near the second end section 50 of the coil housing 36. More specifically, in this embodiment, the inlet 38 extends through the first end section 48 while the outlet 40 extends through the second end section 50. Referring specifically to FIG. 3, the fluid 44 (represented by arrows in FIG. 3) flows from the first end section 48 through the fluid passageway 46 along the length of the coil assembly 16 and out the second end section 50.

Additionally, as illustrated in FIGS. 1–3, the inlet 38 can direct the fluid 44 laterally offset from the coil axis 33 of the coil assembly 16. Further, the outlet 40 can receive the fluid 44 laterally offset from the coil axis 33 of the coil assembly 16. With this design, the fluid 44 entering the fluid passageway 46 swirls around the fluid passageway 46. With the fluid 44 swirling in the fluid passageway 46, the distance traveled by the fluid 44 is increased in the fluid passageway 46. This increases the thermal transfer from the coil assembly 16 to the fluid 44. Moreover, the single inlet 38 and the single outlet 40 illustrated in FIGS. 1 and 3 can be replaced by a pair of inlets 38 near the first end section 48 and a pair of outlets 40 near the second end section 50. This allows for the use of smaller lines or hoses from the fluid source 42 to the coil housing 36. The smaller lines or hoses flex easier than the larger lines and hoses.

Figure 6:
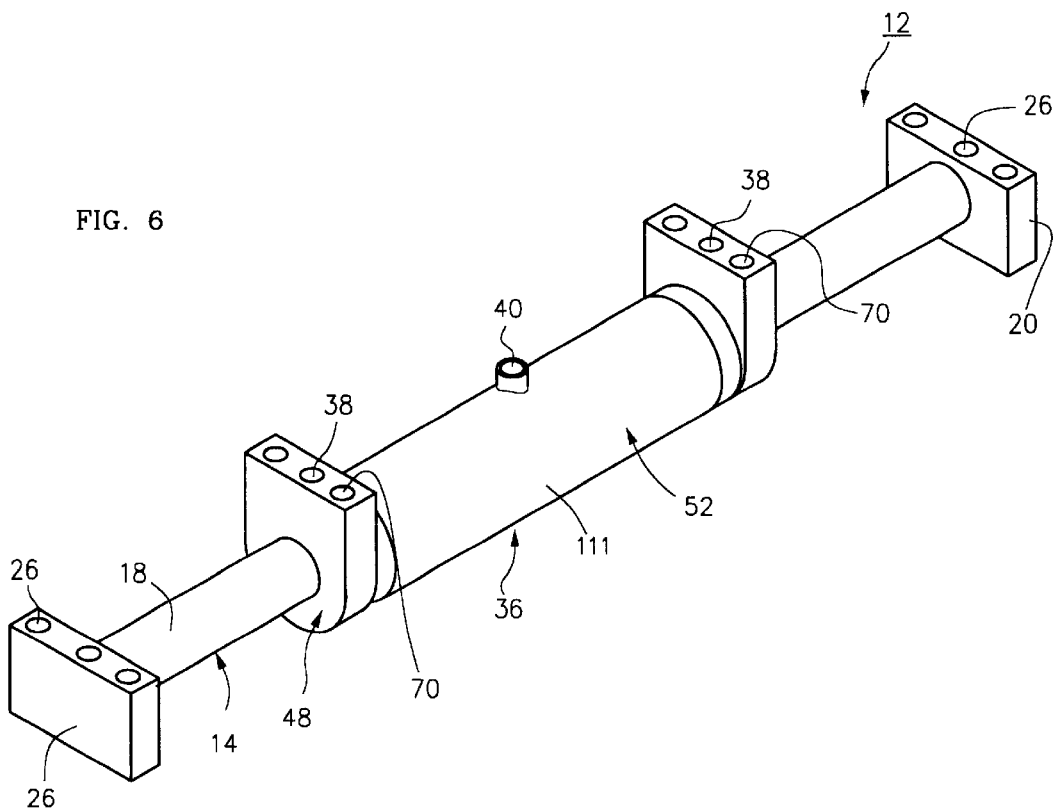
FIG. 6 is a perspective view of yet another alternate embodiment of a linear motor having features of the present invention.

Alternately, in the embodiment illustrated in FIGS. 6 and 7, the invention includes a pair of inlets 38 and a centrally located outlet 40. Each inlet 38 extends into the fluid passageway 46 near each end section 48, 50 of the coil housing 36. More specifically, one inlet 38 extends into each of the end sections 48, 50. The outlet 40 extends through the first body section 52 into the fluid passageway 46 intermediate the end sections 48, 50 of the coil housing 36. In this embodiment, the fluid 44 enters the fluid passageway 46 near each end section 48, 50 of the coil housing 36 and exits from the center of the coil housing 36. Because the end sections 48, 50 support the coil assembly 16, the coil supports 82 are easily cooled with the relatively cool fluid 44 just entering the fluid passageway 46.

Additionally, as illustrated in FIG. 7, the coil assembly 16 includes two coil arrays 30 and the spacer 34 that connects and supports the two coil arrays 30. The spacer 34, provided in FIG. 7, is annular shaped and includes a plurality of spaced apart, spacer apertures 92 which allow the fluid 44 to flow from the second passageway 80 to the outlet 40. Alternately, for example, the spacer 34 could replaced with a plurality of spaced pins (not shown) that extend between the coil arrays 30. The spacer 34 is preferably made of a low or non-electrically conductive, non-magnetic material, such as low electrical conductivity stainless steel or titanium or non-electrically conductive plastic or ceramic.

FIG. 8 illustrates a cross-sectional view of yet another embodiment of a coil housing 36 having features of the present invention. In particular, the coil housing 36 includes two inlets 38 and an outlet 40. One of the inlets 38 is a primary inlet 94 which extends into the fluid passageway 46 near the first end section 48 and one of the inlets 38 is a secondary inlet 96 which extends into the fluid passageway 46 near the second end section 50. More specifically, in the embodiment illustrated, the primary inlet 94 extends through the first end section 48, the secondary inlet 96 extends through the second end section 50, and the outlet 40 extends through the second end section 50.

In this embodiment, the secondary inlet 96 allows for additional cooling to the coil supports 82 near the secondary inlet 96. During operation, the fluid 44 that enters from the primary inlet 94 is relatively hot near the outlet 40 and may not be able to properly cool the coil supports 82 near the outlet 40. As provided above, it is important to prevent direct heat transfer from the coils 32 through the coil supports 82 to the coil housing 36. Thus, additional fluid 44 is added through the secondary inlet 96 to cool the coil supports 82 near the outlet 40.

Preferably, in the embodiment illustrated in FIG. 8, the coil housing 36 includes a buffer wall 98 between the secondary inlet 96 and the outlet 40. The buffer wall 98 directs the fluid 44 from the secondary inlet 96 to around the coil supports 82 near the outlet 40. The buffer wall 98 can be an annular, disk shaped plate that includes a plurality of spaced apart buffer wall apertures 100 that receive coil support 82. The buffer wall 98 can be made of a number of materials including a rigid or an elastic material.

The fluid source 42 forces or directs the fluid 44 through the fluid passageway 46 to cool the coil assembly 16. The design of the fluid source 42 can be varied to suit the cooling requirements of the coil assembly 16. Referring to FIG. 1, the fluid source 42 illustrated includes (i) a reservoir 102 for receiving the fluid 44, (ii) a heat exchanger 104, i.e. a chiller unit, for cooling the fluid 44, (iv) an outlet pipe 106 which connects the outlet 40 with the heat exchanger 104, (v) a fluid pump 108, and (vi) an inlet pipe 110 for transferring the fluid 44 from the fluid pump 108 to the inlet 38.

The temperature, flow rate, and type of the fluid 44 is selected and controlled to precisely control the temperature of the coil assembly 16. For the embodiments illustrated, the fluid temperature is maintained between approximately 20 and 25° C., the flow rate is between approximately one and five liters per minute. A suitable fluid 44 is Flourinert type FC-77, made by 3M Company in Minneapolis, Minn. Preferably, the rate of flow of the fluid 44 and the temperature of fluid 44 is controlled to maintain an outer surface 111 of the coil housing 36 at a predetermined temperature. By controlling the outer surface 111 temperature of the coil housing 36, heat transferred from the coil assembly 16 to the surrounding environment can be eliminated.

For the embodiment illustrated in FIG. 8, the fluid source 42 supplies fluid 44 at a greater rate to the primary inlet 94 than the secondary inlet 96. As provided herein, the flow rate to the secondary inlet 96 is between approximately seventy and ninety percent less than the flow rate to the primary inlet 94. The secondary inlet 96 allows for additional fluid 44 flow to the coil supports 82 near the second end section 50. In this embodiment, the majority of fluid 44 enters the fluid passageway 46 near the first end section 48, flows along the coil assembly 16 and exits from the second end section 50. Additional fluid 44 flows through the secondary inlet 96 and out the outlet 40.

Figure 10:
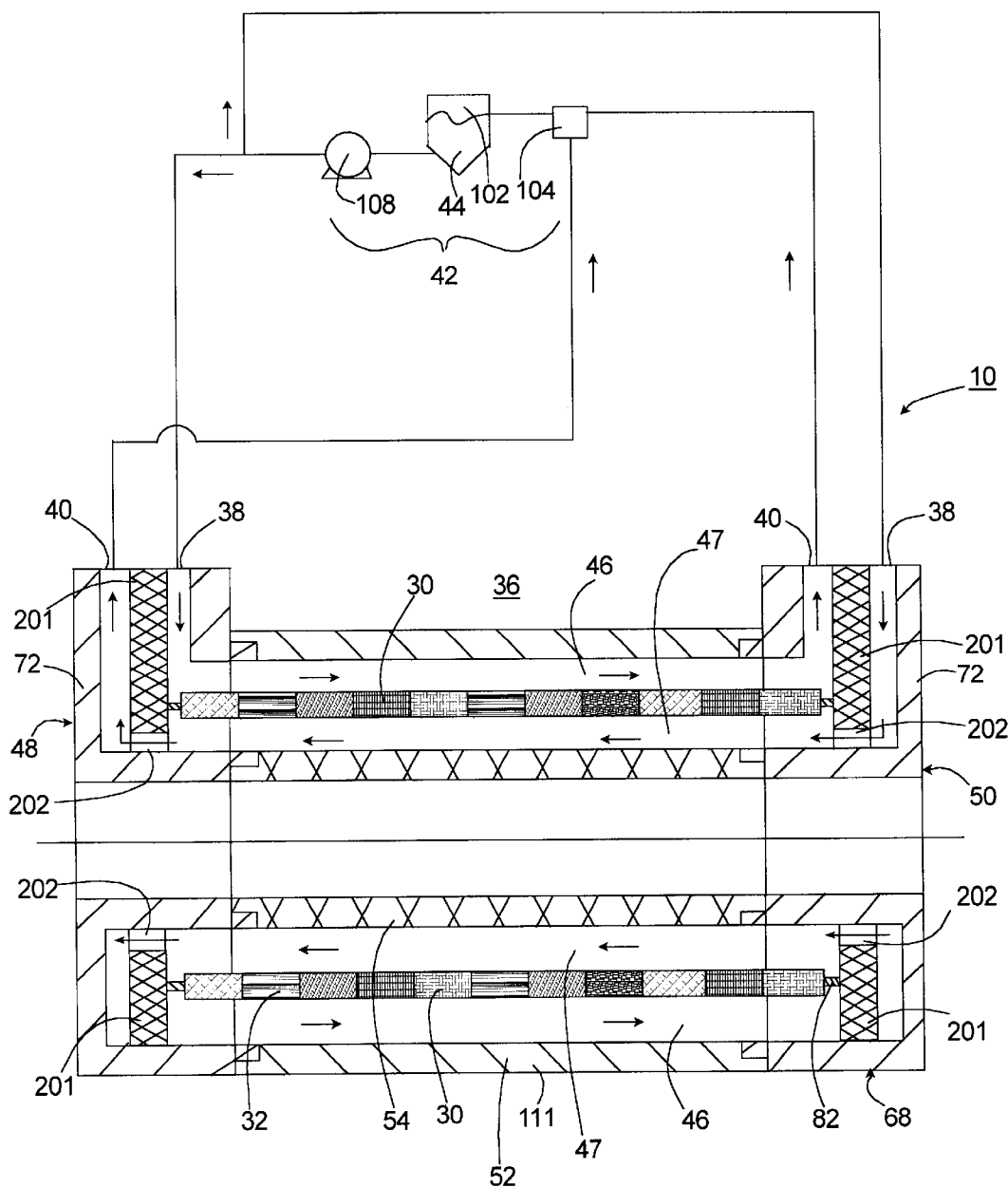
FIG. 10 is a cross-sectional view of another embodiment of a coil assembly, a coil housing and a circulating system having features of the present invention.

FIG. 10 illustrates yet another embodiment of the present invention. In this embodiment, the motor 12 includes a separate, second fluid passageway 47 near the coil assembly 16. In this embodiment, the second fluid passageway 47 is substantially concentric with the fluid passageway 46 and the coil assembly 16. Preferably, in this embodiment, fluid 44 from the fluid source 42 is directed into the second fluid passageway 47 in the opposite direction than the fluid 44 is directed into the fluid passageway 46. More specifically, in the fluid passageway 46, fluid 44 flows from the first end section 48 towards the second end section 50. In the second fluid passageway 47, fluid 44 flows from the second end section 50 towards the first end section 48. This design allows for more uniform cooling of the coil assembly 16 and the motor 12 because each end section 48, 50 receive relatively cool fluid 44.

In the embodiment illustrated in FIG. 10, each end section 48, 50 include both an inlet 38 and an outlet 40. The fluid passageway 46 is separated from the second fluid passageway 47 in each end section 48, 50 by a wall 201 positioned in the end channel 72 of each end section 48, 50. Further, each wall 201 includes an aperture 202 that allows the fluid 44 to pass into the second fluid passageway 47. Further, in this embodiment, each coil support 82 is tubular shaped and forms a wall that separates the fluid passageway 46 from the second fluid passageway 47.

Figure 11:
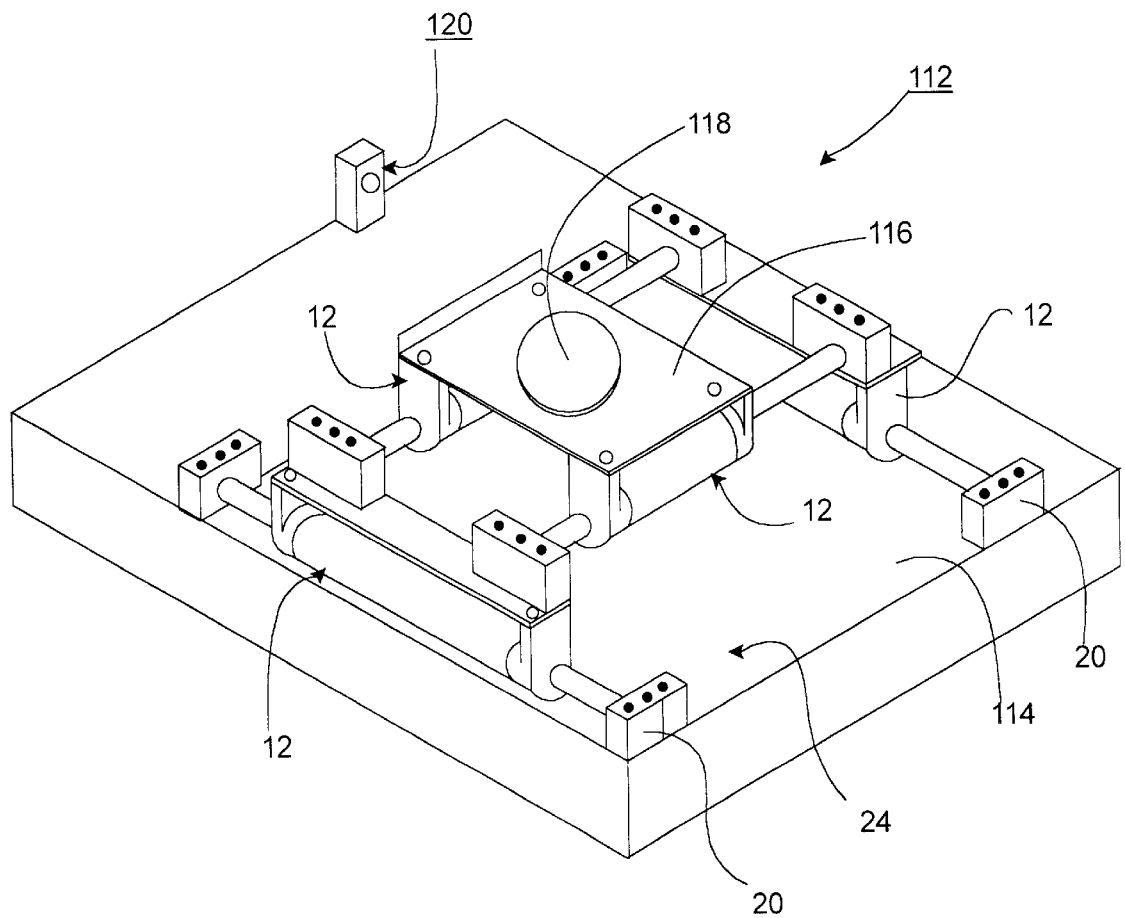
FIG. 11 is a perspective view of a portion of an exposure apparatus having features of the present invention.

FIG. 11 illustrates four motors 12 being used with a portion of an exposure apparatus 112 such as a photolithography system. In FIG. 11, the mounts 20 of two of the motors 12 are secured to the mounting surface 24, i.e. a wafer stage base 114 and the object moved by motors 12 is a wafer stage 116 retaining a semiconductor wafer 118. FIG. 11 also illustrates a portion of a metrology system 120 (such as an interferometer) used to monitor the position of the wafer stage 116.

Importantly, with the present invention, the circulating system 10 maintains the outside surface 111 of each motor 12 at a set temperature. This minimizes the effect of the motors 12 on the temperature of the surrounding environment. This also allows the metrology system 120 to take accurate measurements of the position of the wafer stage 116. As a result thereof, the quality of the integrated circuits formed on the wafer 118 is improved.

Figure 12:
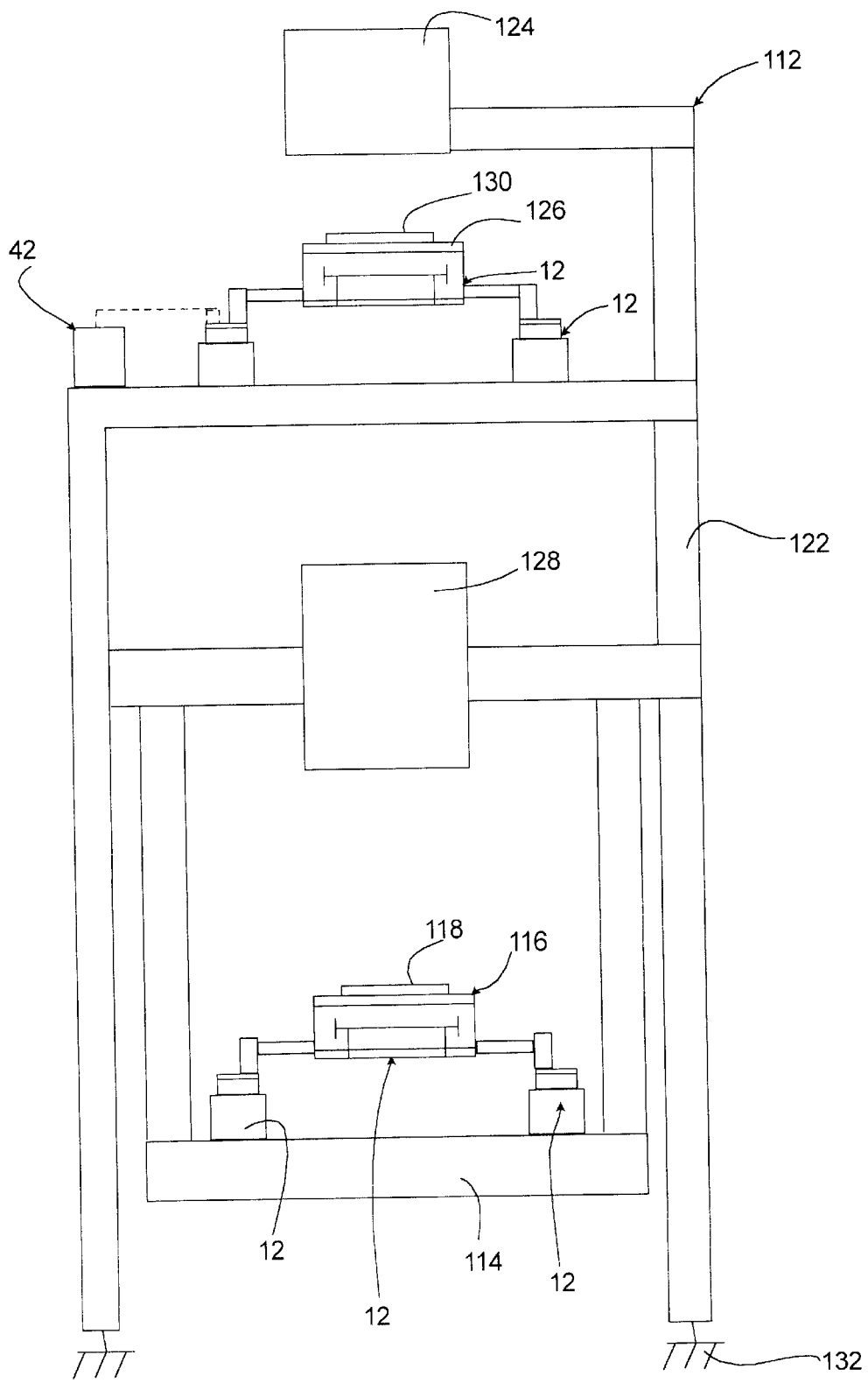
FIG. 12 is a schematic illustration of an exposure apparatus having features of the present invention.

FIG. 12 is a schematic view illustrating an exposure apparatus 112 useful with the present invention. The exposure apparatus 112 includes an apparatus frame 122, an illumination source or irradiation source 124, a reticle stage 126, a lens assembly 128, and the wafer stage 116. One or more of the motors 12 provided herein can be used to move and position one or both of the stages 116, 126.

The exposure apparatus 112 is particularly useful as a lithographic device that transfers a pattern (not shown) of an integrated circuit from a reticle 130 onto the semiconductor wafer 118. The exposure apparatus 112 is mounted to a base 132, i.e., a floor or the ground or some other supporting structure.

The apparatus frame 122 is rigid and supports the components of the exposure apparatus 112. The design of the apparatus frame 122 can be varied to suit the design requirements for the rest of the exposure apparatus 112. The apparatus frame 122 illustrated in FIG. 12 supports the reticle stage 126, the wafer stage 116, the lens assembly 128, and the illumination source 124 above the base 132. Alternately, for example, separate, individual structures (not shown) can be used to support the stages 116, 126, the illumination source 124 and the lens assembly 128 above the base 132.

The illumination source 124 emits the beam of light energy that selectively illuminates different portions of the reticle 130 and exposes the wafer 118. In FIG. 12, the illumination source 124 is illustrated as being supported above the reticle stage 126. Typically, however, the illumination source 124 is secured to one of the sides of the apparatus frame 122 and the energy beam from the illumination source 124 is directed to above the reticle stage 126.

The lens assembly 128 projects and/or focuses the light passing through reticle 130 to the wafer 118. Depending upon the design of the apparatus 112, the lens assembly 128 can magnify or reduce the image illuminated on the reticle 130.

The reticle stage 126 holds and precisely positions the reticle 130 relative to the lens assembly 128 and the wafer 118. Somewhat similarly, the wafer stage 116 holds and positions the wafer 118 with respect to the projected image of the illuminated portions of the reticle 130. In the embodiment illustrated in FIG. 12, the wafer stage 116 and the reticle stage 126 are positioned by linear motors 12 having features of the present invention. Depending upon the design, the apparatus 112 can also include additional servo drive units, linear motors and planar motors to move the stages 116, 126.

There are a number of different types of lithographic devices. For example, the exposure apparatus 112 can be used as a scanning type photolithography system that exposes the pattern from the reticle 130 onto the wafer 118. In a scanning type photolithography system, the reticle 130 is moved perpendicular to an optical axis of the lens assembly 128 by the reticle stage 126 and the wafer 118 is moved perpendicular to an optical axis of the lens assembly 128 by the wafer stage 116. Scanning of reticle 130 and the wafer 118 occurs while the reticle 130 and the wafer 118 are moving synchronously.

Alternately, the exposure apparatus 112 can be a step-and-repeat type photolithography system that exposes the reticle 130 while the reticle 130 and the wafer 118 are stationary. In the step and repeat process, the wafer 118 is in a constant position relative to the reticle 130 and the lens assembly 128 during the exposure of an individual field. Subsequently, between consecutive exposure steps, the wafer 118 is consecutively moved by the wafer stage 116 perpendicular to the optical axis of the lens assembly 128 so that the next field of the semiconductor wafer 118 is brought into position relative to the lens assembly 128 and the reticle 130 for exposure. Following this process, the images on the reticle 130 are sequentially exposed onto the fields of the wafer 118.

The use of the exposure apparatus 112 provided herein is not limited to a photolithography system for semiconductor manufacturing. The exposure apparatus 112, for example, can be used as an LCD photolithography system that exposes a liquid crystal display device pattern onto a rectangular glass plate or a photolithography system for manufacturing a thin film magnetic head. Further, the present invention can also be applied to a proximity photolithography system that exposes a mask pattern by closely locating a mask and a substrate without the use of a lens assembly. Moreover, the linear motor 12 provided herein can be used in other devices, including other semiconductor processing equipment, elevators, electric razors, machine tools, metal cuffing machines, inspection machines and disk drives.

The illumination source 124 can be g-line (436 nm), i-line (365 nm), KrF excimer laser (248 nm), ArF excimer laser (193 nm) and $F_2$ laser (157 nm). Alternately, the illumination source 124 can also use charged particle beams such as x-ray and electron beam. For instance, in the case where an electron beam is used, thermionic emission type lanthanum hexaboride ($LaB_6$) or tantalum (Ta) can be used as an electron gun. Furthermore, in the case where an electron beam is used, the structure could be such that either a mask is used or a pattern can be directly formed on a substrate without the use of a mask.

In terms of the magnification of the lens assembly 128 included in the photolithography system, the lens assembly 128 need not be limited to a reduction system. It could also be a 1x or magnification system.

With respect to a lens assembly 128, when far ultra-violet rays such as the excimer laser is used, glass materials such as quartz and fluorite that transmit far ultra-violet rays is preferable to be used. When the $F_2$ type laser or x-ray is used, the lens assembly 128 should preferably be either catadioptric or refractive (a reticle should also preferably be a reflective type), and when an electron beam is used, electron optics should preferably consist of electron lenses and deflectors. The optical path for the electron beams should be in a vacuum.

Also, with an exposure device that employs vacuum ultra-violet radiation (VUV) of wavelength 200 nm or lower, use of the catadioptric type optical system can be considered. Examples of the catadioptric type of optical system include the disclosure Japan Patent Application Disclosure No.8-171054 published in the Official Gazette for Laid-Open Patent Applications and its counterpart U.S. Pat. No. 5,668,672, as well as Japan Patent Application Disclosure No.10-20195 and its counterpart U.S. Pat. No. 5,835,275. In these cases, the reflecting optical device can be a catadioptric optical system incorporating a beam splitter and concave mirror. Japan Patent Application Disclosure No.8-334695 published in the Official Gazette for Laid-Open Patent Applications and its counterpart U.S. Pat. No. 5,689,377 as well as Japan Patent Application Disclosure No. 10-3039 and its counterpart U.S. patent application Ser. No. 873,605 (Application Date: Jun. 12, 1997) also use a reflecting-refracting type of optical system incorporating a concave mirror, etc., but without a beam splitter, and can also be employed with this invention. As far as is permitted, the disclosures in the above-mentioned U.S. patents, as well as the Japan patent applications published in the Official Gazette for Laid-Open Patent Applications are incorporated herein by reference.

Further, in photolithography systems, when linear motors (see U.S. Pat. Nos. 5,623,853 or 5,528,118) are used in a wafer stage or a mask stage, the linear motors can be either an air levitation type employing air bearings or a magnetic levitation type using Lorentz force or reactance force. Additionally, the stage could move along a guide, or it could be a guideless type stage that uses no guide. As far as is permitted, the disclosures U.S. Pat. Nos. 5,623,853 and 5,528,118 are incorporated herein by reference.

Alternatively, one of the stages could be driven by a planar motor, which drives the stage by electromagnetic force generated by a magnet unit having two-dimensionally arranged magnets and an armature coil unit having two-dimensionally arranged coils in facing positions. With this type of driving system, either one of the magnet unit or the armature coil unit is connected to the stage and the other unit is mounted on the moving plane side of the stage.

Movement of the stages as described above generates reaction forces that can affect performance of the photolithography system. Reaction forces generated by the wafer (substrate) stage motion can be mechanically released to the floor (ground) by use of a frame member as described in U.S. Pat. No. 5,528,118 and published Japanese Patent Application Disclosure No. 8-166475. Additionally, reaction forces generated by the reticle (mask) stage motion can be mechanically released to the floor (ground) by use of a frame member as described in U.S. Pat. No. 5,874,820 and published Japanese Patent Application Disclosure No. 8-330224. As far as is permitted, the disclosures of U.S. Pat. Nos. 5,528,118 and 5,874,820 and published Japanese Patent Application Disclosure Nos. 8-166475 and 8-330224 are incorporated herein by reference.

As described above, a photolithography system according to the above-described embodiments can be built by assembling various subsystems, including each element listed in the appended claims, in such a manner that prescribed mechanical accuracy, electrical accuracy and optical accuracy are maintained. In order to maintain the various accuracies, prior to and following assembly, every optical system is adjusted to achieve its optical accuracy. Similarly, every mechanical system and every electrical system are adjusted to achieve their respective mechanical and electrical accuracies. The process of assembling each subsystem into a photolithography system includes mechanical interfaces, electrical circuit wiring connections and air pressure plumbing connections between each subsystem. Needless to say, there is also a process where each subsystem is assembled prior to assembling a photolithography system from the various subsystems. Once a photolithography system is assembled using the various subsystems, total adjustment is performed to make sure that every accuracy is maintained in the complete photolithography system. Additionally, it is desirable to manufacture an exposure system in a clean room where the temperature and cleanliness are controlled.

Figure 13:
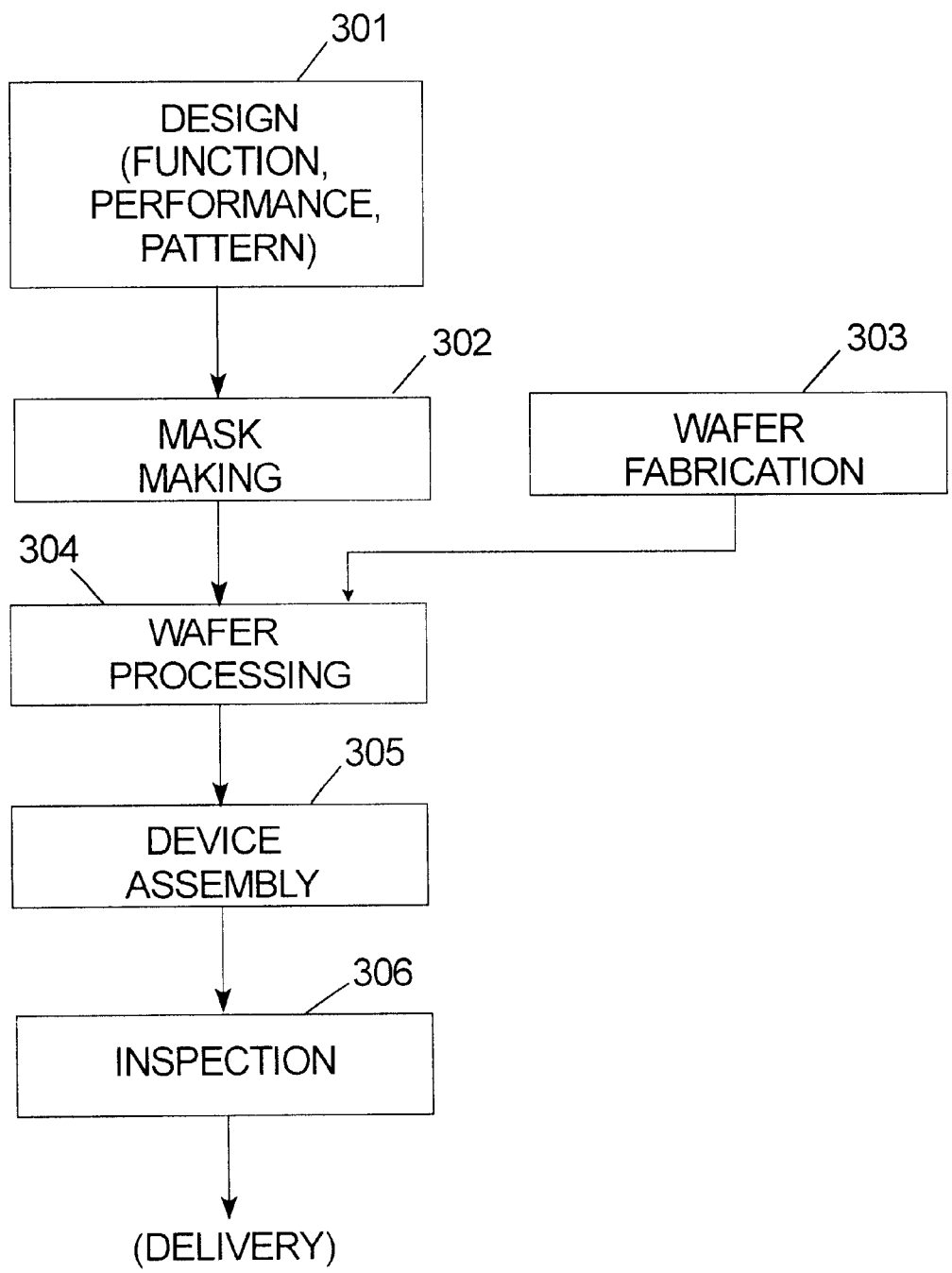
FIG. 13 is a flow chart that outlines a process for manufacturing semiconductor devices in accordance with the present invention.

Further, semiconductor devices can be fabricated using the above-described systems, by the process shown generally in FIG. 13. In step 301 the device's function and performance characteristics are designed. Next, in step 302, a mask (reticle) having a pattern is designed according to the previous designing step, and in a parallel step 303 a wafer is made from a silicon material. The mask pattern designed in step 302 is exposed onto the wafer from step 303 in step 304 by a photolithography system described hereinabove in accordance with the present invention. In step 305 the semiconductor device is assembled (including the dicing process, bonding process and packaging process), and then finally the device is inspected in step 306.

Figure 14:
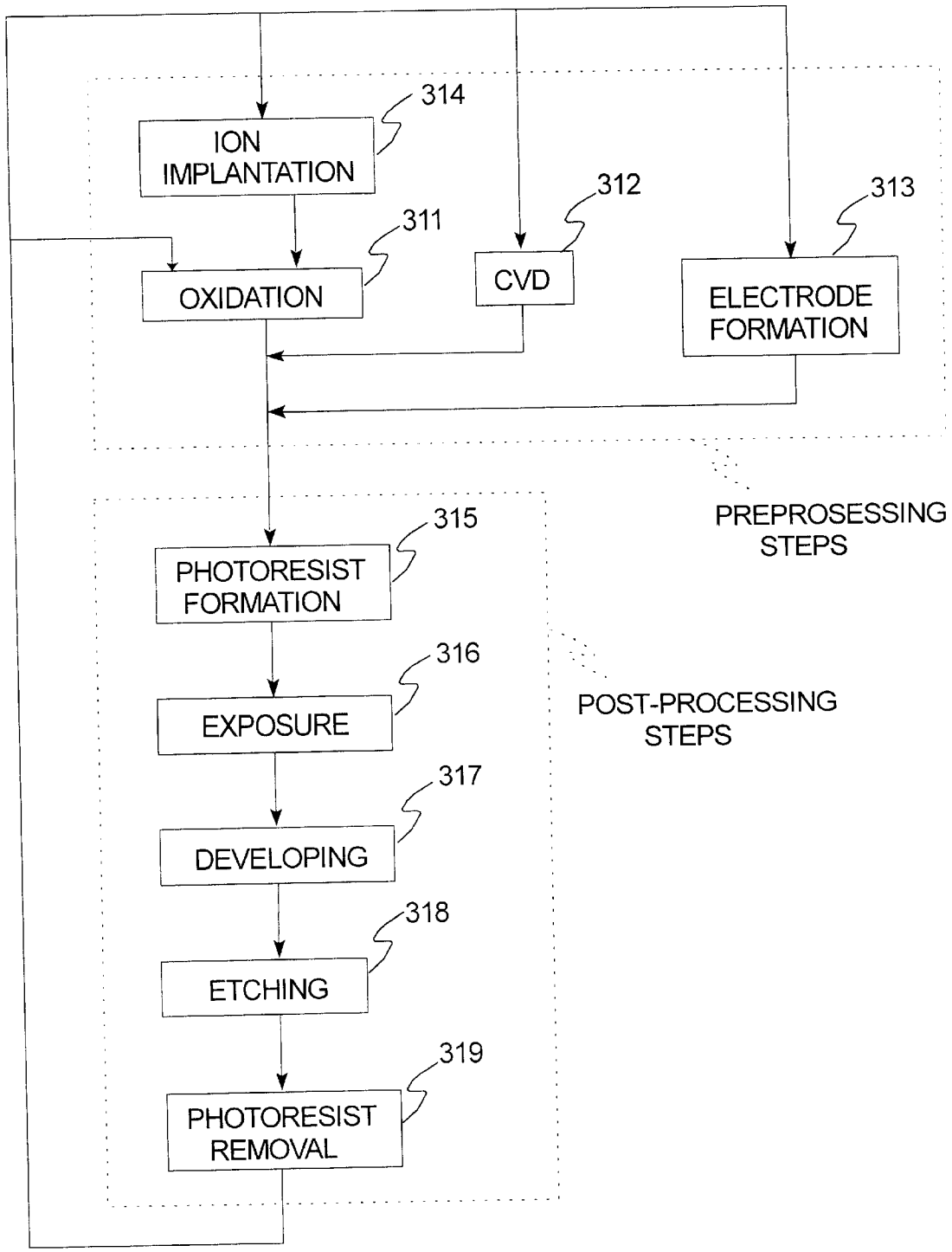
FIG. 14 is a flow chart that outlines wafer processing in more detail.

FIG. 14 illustrates a detailed flowchart example of the above-mentioned step 304 in the case of fabricating semiconductor devices. In FIG. 14, in step 311 (oxidation step), the wafer surface is oxidized. In step 312 (CVD step), an insulation film is formed on the wafer surface. In step 313 (electrode formation step), electrodes are formed on the wafer by vapor deposition. In step 314 (ion implantation step), ions are implanted in the wafer. The above-mentioned steps 311–314 form the preprocessing steps for wafers during wafer processing, and selection is made at each step according to processing requirements.

At each stage of wafer processing, when the above-mentioned preprocessing steps have been completed, the following post-processing steps are implemented. During post-processing, firstly, in step 315 (photoresist formation step), photoresist is applied to a wafer. Next, in step 316, (exposure step), the above-mentioned exposure device is used to transfer the circuit pattern of a mask (reticle) to a wafer. Then, in step 317 (developing step), the exposed wafer is developed, and in step 318 (etching step), parts other than residual photoresist (exposed material surface) are removed by etching. In step 319 (photoresist removal step), unnecessary photoresist remaining after etching is removed.

Multiple circuit patterns are formed by repetition of these preprocessing and post-processing steps.

Importantly, with the present invention, the circulating system 10 maintains the outside surface 111 of the motor 12 at a set temperature. This minimizes the effect of the motor 12 on the temperature of the surrounding environment. Further, the cooling system 10 maintains the temperature of the coils 32 in the coil assembly 16. This allows the coils 32 to operate more efficiently and increases the useful life of the coils 32.

While the particular linear motor 12 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A shaft-type linear motor adapted for use with a fluid source including a fluid, the motor comprising:
 a magnet array;
 a tubular shaped coil assembly that encircles a portion of the magnet array;
 a circulating system that circulates the fluid, the circulating system including (i) a coil housing having a tubular shaped, housing cavity which is sized and shaped to receive the coil assembly and provide a fluid passageway between the coil housing and the coil assembly, and (ii) an inlet into the fluid passageway, the inlet being in fluid communication with the fluid source so that fluid from the fluid source can be supplied to the fluid passageway.

2. The motor of claim 1 including a plurality of spaced apart coil supports, each coil support extending between the coil housing and the coil assembly for securing the coil assembly spaced apart from the coil housing.

3. The motor of claim 2 wherein at least one of the coil supports is arc shaped.

4. The motor of claim 1 wherein the fluid is used for cooling the coil assembly.

5. A stage device including the motor of claim 1.

6. The motor of claim 1 wherein the coil housing includes a first end section and a second end section, the end sections being spaced apart sufficiently so that the coil assembly fits between the first end section and the second end section.

7. The motor of claim 6 wherein the inlet extends into the fluid passageway near the first end section and wherein the circulating system includes an outlet which extends into the fluid passageway near the second end section.

8. The motor of claim 6 including (i) at least two inlets into the fluid passageway, each inlet being in fluid communication with the fluid source, each inlet extending into the fluid passageway near one of the end sections, and (ii) an outlet which extends into the fluid passageway substantially intermediate the end sections.

9. The motor of claim 6 including at least two inlets into the fluid passageway, each inlet being in fluid communication with the fluid source, wherein one of the inlets is a primary inlet and one of the inlets is a secondary inlet, and wherein the fluid source supplies fluid at a greater rate to the primary inlet than the secondary inlet.

10. The motor of claim 6 including a second fluid passageway, wherein in the fluid passageway the fluid flows toward the second end section from the first end section, and in the second fluid passageway the fluid flows toward the first end section from the second end section.

11. An exposure apparatus including the motor of claim 1.

12. An object on which an image has been formed by the exposure apparatus of claim 11.

13. A motor combination comprising the motor of claim 1 and a fluid source, wherein the rate of flow of the fluid from the fluid source is controlled so that an outer surface of the coil housing is maintained at a set temperature.

14. The motor of claim 1 wherein the coil assembly includes a plurality of tubular shaped coils that are secured together substantially side by side along a coil axis.

15. A method for cooling a shaft-type linear motor, the motor including a magnet array and a tubular shaped coil assembly, the method comprising the steps of:

providing a coil housing that encircles at least a portion of the magnet array, the coil housing including a tubular shaped housing cavity that is sized and shaped to receive the coil assembly and define a fluid passageway between the coil housing and the coil assembly;

positioning the coil assembly in the housing cavity; and directing a fluid through the fluid passageway to cool the coil assembly.

16. The method of claim 15 including the step of securing the coil assembly to the coil housing with a plurality of spaced apart coil supports, the coil supports maintaining the coil assembly spaced apart from the coil housing.

17. The method of claim 15 including the step of controlling the rate of flow of the fluid so that an outer surface of the coil housing is maintained at a set temperature.

18. A method for making a linear motor adapted for use with a fluid source including a fluid, the method comprising the steps of:

providing a magnet array;

providing a tubular shaped coil assembly that encircles a portion of the magnet array; and providing a circulating system including a coil housing having a first body section that is sized and shaped to substantially encircle at least a portion of the coil assembly and provide a fluid passageway between the coil housing and the coil assembly, and an inlet into the fluid passageway to being in fluid communication with the fluid source so that the fluid from the fluid source can be supplied to the fluid passageway.

19. A method for making an exposure apparatus that forms an image on an object, the method comprising the steps of:

providing an irradiation apparatus that irradiates the object with radiation to form the image on the object; and providing the motor made by the method of claim 18.

20. A method of making a device utilizing the exposure apparatus made by the method of claim 19.

21. The method of claim 18 including the step of controlling the rate of flow of the fluid from the fluid source so that an outer surface of the coil housing is maintained at a set temperature.

22. The method of claim 18 wherein the step of providing a tubular shaped coil assembly includes the step of securing a plurality of tubular shaped coils together substantially side by side along a coil axis.

23. A circulating system adapted for use with a fluid from a fluid source for a motor, the motor including a coil assembly, the circulating system comprising:

a coil housing including a first body section which is sized and shaped to substantially encircle at least a portion of the coil assembly, the coil housing including a first end section and a second end section, the end sections being spaced apart sufficiently so that the coil assembly fits between the first end section and the second end section;

a first fluid passageway between the coil housing and the coil assembly including a first inlet which is in fluid communication with the fluid source so that the fluid from the fluid source flows toward the second end section from the first end section; and a second fluid passageway between the coil housing and the coil assembly including a second inlet which is in fluid communication with the fluid source so that the fluid from the fluid source flows toward the first end section from the second end section.

24. A motor including a magnet array, a coil assembly, and the circulating system of claim 23.

25. The motor of claim 24 wherein the coil assembly is substantially tubular shaped and encircles a portion of the magnet array.

26. A motor combination comprising the motor of claim 24 and a fluid source, wherein the rate of flow of the fluid from the fluid source is controlled so that an outer surface of the coil housing is maintained at a set temperature.

27. An exposure apparatus including the motor of claim 24.

28. An object on which an image has been formed by the exposure apparatus of claim 27.

29. A circulating system adapted for use with a fluid from a fluid source for a motor, the motor including a coil assembly, the circulating system comprising:

a coil housing including a first body section which is sized and shaped to substantially encircle at least a portion of the coil assembly and provide a fluid passageway between the coil housing and the coil assembly, the coil housing including a first end section and a second end section, the end sections being spaced apart sufficiently so that the coil assembly fits between the first end section and the second end section;

at least two inlets into the fluid passageway, each inlet being in fluid communication with the fluid source so that fluid from the fluid source can be supplied to the fluid passageway, each inlet extending into the fluid passageway near one of the end sections; and an outlet that extends into the fluid passageway substantially intermediate the end sections.

30. A motor including a magnet array, a coil assembly, and the circulating system of claim 29.

31. A motor combination comprising the motor of claim 30 and a fluid source, wherein the rate of flow of the fluid from the fluid source is controlled so that an outer surface of the coil housing is maintained at a set temperature.

32. An exposure apparatus including the motor of claim 30.

33. An object on which an image has been formed by the exposure apparatus of claim 32.

34. A circulating system adapted for use with a fluid from a fluid source for a motor, the motor including a coil assembly, the circulating system comprising:

a coil housing including a first body section which is sized and shaped to substantially encircle at least a portion of the coil assembly and provide a fluid passageway between the coil housing and the coil assembly; and at least two inlets into the fluid passageway, each inlet being in fluid communication with the fluid source so that fluid from the fluid source can be supplied to the fluid passageway, one of the inlets being a primary inlet and one of the inlets being a secondary inlet, the fluid source supplying fluid at a greater rate to the primary inlet than the secondary inlet.

35. The circulating system of claim 34 wherein the coil housing includes a first end section and a second end section, the end sections being spaced apart sufficiently so that the coil assembly fits between the first end section and the second end section and wherein the primary inlet extends into the fluid passageway near the first end section and the secondary inlet extends into the first passageway near the second end section.

36. A motor including a magnet array, a coil assembly, and the circulating system of claim 34.

37. The motor of claim 36 wherein the coil assembly is substantially tubular shaped and encircles a portion of the magnet array.

38. A motor combination comprising the motor of claim 36 and a fluid source, wherein the rate of flow of the fluid from the fluid source is controlled so that an outer surface of the coil housing is maintained at a set temperature.

39. An exposure apparatus including the motor of claim 36.

40. An object on which an image has been formed by the exposure apparatus of claim 39.

41. A circulating system adapted for use with a fluid from a fluid source for a motor, the motor including a coil assembly, the circulating system comprising:

a coil housing including a first body section, a second body section, a first end section and a second end section, the first body section being sized and shaped to substantially encircle at least a portion of the coil assembly and provide a fluid passageway between the coil housing and the coil assembly, the second body section being sized and shaped to be substantially encircled by the coil assembly, the end sections being spaced apart sufficiently so that the coil assembly fits between the first end section and the second end section; and an inlet into the fluid passageway, the inlet being in fluid communication with the fluid source so that fluid from the fluid source can be supplied to the fluid passageway.

42. A motor including a magnet array, a coil assembly, and the circulating system of claim 41.

43. The motor of claim 42 wherein the coil assembly substantially encircles a portion of the magnet array.

44. A motor combination comprising the motor of claim 42 and a fluid source, wherein the rate of flow of the fluid from the fluid source is controlled so that an outer surface of the coil housing is maintained at a set temperature.

45. An exposure apparatus including the motor of claim 42.

46. An object on which an image has been formed by the exposure apparatus of claim 45.

47. A method for cooling a shaft-type linear motor, the motor including a magnet array and a tubular shaped coil assembly, the method comprising the steps of:

providing a coil housing including a tubular shaped housing cavity that is sized and shaped to receive the coil assembly and define a fluid passageway between the coil housing and the coil assembly, the coil housing having an outer surface;

positioning the coil assembly in the housing cavity;

directing a fluid through the fluid passageway to cool the coil assembly; and controlling the rate of flow of the fluid so that the outer surface of the coil housing is maintained at a set temperature.

48. The method of claim 47 wherein the step of providing a coil housing includes providing a coil housing that encircles at least a portion of the magnet array.

49. A method for making an exposure apparatus that forms an image on an object, the method comprising the steps of:

providing an irradiation apparatus that irradiates the object with radiation to form the image on the object; and providing a motor as a driving force for moving the object; and connecting the cooling device that utilizes the method of claim 47.

50. A method of making a device utilizing the exposure apparatus made by the method of claim 49.

51. A circulating system adapted for use with a fluid from a fluid source for a motor, the motor including a coil assembly, the circulating system comprising:

a coil housing including a first body section which is sized and shaped to substantially encircle at least a portion of the coil assembly;

a first fluid passageway positioned near the coil assembly which is in fluid communication with the fluid source so that the fluid from the fluid source flows in a first direction in the first fluid passageway; and a second fluid passageway positioned near the coil assembly which is in fluid communication with the fluid source so that the fluid from the fluid source flows in a second direction in the second fluid passageway.

52. The circulating system of claim 51 wherein the second direction is substantially opposite from the first direction.

53. The circulating system of claim 51 wherein the coil housing includes a first end section and a second end section, the end sections being spaced apart sufficiently so that the coil assembly fits between the first end section and the second end section.

54. The circulating system of claim 53 wherein the first fluid passageway includes a first inlet which is in fluid communication with the fluid source and the second fluid passageway includes a second inlet which is in fluid communication with the fluid source and wherein the first inlet is positioned near the first end section and the second inlet is positioned near the second end section.

55. A motor including a magnet array, a coil assembly, and the circulating system of claim 51.

56. The motor of claim 55 wherein the coil assembly substantially encircles a portion of the magnet array.

57. A motor combination comprising the motor of claim 55 and a fluid source, wherein the rate of flow of the fluid from the fluid source is controlled so that an outer surface of the coil housing is maintained at a set temperature.

58. An exposure apparatus including the motor of claim 55.

59. An object on which an image has been formed by the exposure apparatus of claim 58.

60. A circulating system adapted for use with a fluid from a fluid source for a motor, the motor including a coil assembly, the circulating system comprising:

a coil housing including a first body section which is sized and shaped to substantially encircle at least a portion of the coil assembly and provide a fluid passageway between the coil housing and the coil assembly, the coil housing including a first end section and a second end section, the end sections being spaced apart sufficiently so that the coil assembly fits between the first end section and the second end section; and an outlet that extends into the fluid passageway substantially intermediate the end sections.

61. The circulating system of claim 60 including a first inlet and a second inlet into the fluid passageway, each inlet being in fluid communication with the fluid source, wherein the outlet is positioned between the first inlet and the second inlet.

62. A motor including a magnet array, a coil assembly, and the circulating system of claim 60.

63. A motor combination comprising the motor of claim 62 and a fluid source, wherein the rate of flow of the fluid from the fluid source is controlled so that an outer surface of the coil housing is maintained at a set temperature.

64. An exposure apparatus including the motor of claim 62.

65. An object on which an image has been formed by the exposure apparatus of claim 64.

66. A circulating system adapted for use with a fluid from a fluid source for a motor, the motor including a coil assembly, the circulating system comprising:

a coil housing including a first body section and a second body section, the first body section being sized and shaped to substantially encircle at least a portion of the coil assembly and provide a fluid passageway between the coil housing and the coil assembly, the second body section being sized and shaped to be substantially encircled by the coil assembly.

67. The circulating system of claim 66 including an inlet into the fluid passageway, the inlet being in fluid communication with the fluid source so that fluid from the fluid source can be supplied to the fluid passageway.

68. A motor including a magnet array, a coil assembly, and the circulating system of claim 66.

69. A motor combination comprising the motor of claim 68 and a fluid source, wherein the rate of flow of the fluid from the fluid source is controlled so that an outer surface of the coil housing is maintained at a set temperature.

70. An exposure apparatus including the motor of claim 68.

71. An object on which an image has been formed by the exposure apparatus of claim 70.

72. A motor comprising:

a magnet array;

a tubular shaped coil assembly; and a circulating system that circulates a fluid, the circulating system including (i) a coil housing that receives the coil assembly and provides a fluid passageway near the coil assembly, the coil housing including an outer surface and (ii) a fluid source that supplies the fluid, wherein the rate of flow of the fluid from the fluid source is controlled so that the outer surface of the coil housing is maintained at a set temperature.

73. The motor of claim 72 wherein the coil assembly and the coil housing substantially encircle a portion of the magnet array.

74. An exposure apparatus including the motor of claim 77.

75. An object on which an image has been formed by the exposure apparatus of claim 74.

* * * * *

UNITED STATES PATENT AND TRADEMARK OFFICE
CERTIFICATE OF CORRECTION

PATENT NO. : 6,323,567 B1  
DATED : November 27, 2001  
INVENTOR(S) : Hazelton et al.

Page 1 of 1

It is certified that error appears in the above-identified patent and that said Letters Patent is hereby corrected as shown below:

Column 20,
Line 19-20, please delete "claim 77" and replace it with -- claim 72 --.

Signed and Sealed this

Fourteenth Day of May, 2002

Attest:

JAMES E. ROGAN
*Attesting Officer*  *Director of the United States Patent and Trademark Office*